(12) United States Patent
Gupta et al.

(10) Patent No.: US 8,539,561 B2
(45) Date of Patent: Sep. 17, 2013

(54) SYSTEMS AND METHODS TO CONTROL DEVICE ENDPOINT BEHAVIOR USING PERSONAE AND POLICIES

(75) Inventors: Akhilesh Gupta, Stanford, CA (US); Anupam Joshi, New Delhi (IN); Gopal S. Pingali, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 12/862,335

(22) Filed: Aug. 24, 2010

(65) Prior Publication Data
US 2012/0054853 A1 Mar. 1, 2012

(51) Int. Cl.
*H04L 29/06* (2006.01)

(52) U.S. Cl.
USPC .................................. 726/6; 726/1

(58) Field of Classification Search
USPC .......................................... 726/6, 1
See application file for complete search history.

(56) References Cited

U.S. PATENT DOCUMENTS

| | | | |
|---|---|---|---|
| 6,671,682 B1 * | 12/2003 | Nolte et al. ........................... 1/1 |
| 6,738,753 B1 * | 5/2004 | Hogan ............................. 706/12 |
| 7,086,008 B2 | 8/2006 | Capps et al. | |
| 7,107,269 B2 * | 9/2006 | Arlein et al. ................. 705/26.5 |
| 7,437,677 B1 | 10/2008 | Capps et al. | |
| 7,680,758 B2 * | 3/2010 | Laborczfalvi et al. . 707/999.001 |
| 8,099,758 B2 * | 1/2012 | Schaefer et al. .................. 726/1 |
| 8,126,439 B1 * | 2/2012 | Sankaranaraynan et al. ........................... 455/414.1 |
| 8,233,882 B2 * | 7/2012 | Rogel ............................ 455/411 |
| 8,256,013 B1 * | 8/2012 | Hernacki et al. ................. 726/28 |
| 2002/0080192 A1 * | 6/2002 | King et al. ..................... 345/811 |
| 2003/0126079 A1 * | 7/2003 | Roberson et al. ............... 705/40 |
| 2005/0060532 A1 | 3/2005 | Dorenbosch et al. | |
| 2006/0094429 A1 | 5/2006 | Ramalho et al. | |
| 2006/0136902 A1 | 6/2006 | Monroe et al. | |
| 2006/0259949 A1 * | 11/2006 | Schaefer et al. .................. 726/1 |
| 2007/0061730 A1 | 3/2007 | O'Mahony et al. | |
| 2007/0130462 A1 * | 6/2007 | Law et al. ...................... 713/168 |
| 2007/0277240 A1 * | 11/2007 | Durfee et al. ................... 726/24 |
| 2008/0254892 A1 * | 10/2008 | Saunders et al. ................ 463/42 |
| 2008/0317040 A1 * | 12/2008 | Balay et al. .............. 370/395.21 |
| 2009/0138795 A1 * | 5/2009 | Liu et al. ........................ 715/234 |
| 2009/0138940 A1 * | 5/2009 | Liu et al. ........................... 726/1 |

(Continued)

FOREIGN PATENT DOCUMENTS

| | | |
|---|---|---|
| CN | 101453735 | 6/2009 |
| EP | 1280317 | 1/2003 |

OTHER PUBLICATIONS

Smith, Tony, "Apple attempts to patent fast user switching", posted in Mac Channel, Jul. 11, 2003, 16:45 GMT, available on-line at www.theregister.co.uk/2003/07/11/apple_attempts_to_patnet_fast/ as of Jan. 21, 2010.

*Primary Examiner* — David Garcia Cervetti
(74) *Attorney, Agent, or Firm* — Ference & Associates LLC

(57) ABSTRACT

The creation of multiple personae in mobile devices. Access to personae is controlled based on the persona that is currently active. The creation or existence of different personae helps prevent data leakage or loss, in that any or all of the following characteristics, by way of example, may be manifested: business data and applications are firewalled from applications or other items associated with personal use; connectivity of the device is controlled; resources (such cameras, GPS, other sensors, etc.) on the device are controlled; data are protected even if removable storage or the device itself are lost.

20 Claims, 10 Drawing Sheets

(56) References Cited

U.S. PATENT DOCUMENTS

| | | |
|---|---|---|
| 2009/0175426 A1* | 7/2009 | Beyer et al. ............... 379/93.02 |
| 2010/0169314 A1* | 7/2010 | Green et al. ................. 707/736 |
| 2010/0169337 A1* | 7/2010 | Green et al. ................. 707/758 |
| 2010/0187302 A1* | 7/2010 | Sermersheim et al. ....... 235/380 |
| 2010/0281427 A1* | 11/2010 | Ghosh et al. ................. 715/811 |
| 2011/0018346 A1* | 1/2011 | Dixon ............................ 307/39 |
| 2011/0055890 A1* | 3/2011 | Gaulin et al. .................... 726/1 |
| 2012/0036344 A1* | 2/2012 | Hubner et al. ................... 713/1 |

\* cited by examiner

SYSTEMS AND METHODS TO CONTROL DEVICE ENDPOINT BEHAVIOR USING PERSONAE AND POLICIES

BACKGROUND

Generally, end devices in mobile enterprise scenarios are either owned by individuals or a business (or enterprise), and thus are used for business needs using specialized enterprise applications, as well as for significant personal needs. This is especially the case with end devices such as "smart" mobile phones, while it is also relevant to other endpoints (e.g., laptops, tablets, internet devices, etc.) that access virtualized desktops from a network cloud and from similar enterprise services.

An ongoing problem is that such end devices can be compromised in a way that inadvertently permits unauthorized users to gain access to sensitive data and information. For instance, given open wireless network interfaces (e.g. 802.11, "BLUETOOTH"), external adversaries can probe for vulnerabilities, and use these to install rogue programs or to steal data. The installed rogue programs might further steal data, cause disruptions in operation, and attack other trusted devices.

Data loss is also a concern when a mobile device such as a laptop computer or mobile phone is lost or misplaced. Historically there has not been great effort in alleviating the impact or potential of such problems, as typically it is viewed as an end-user problem. There have been some conventional efforts at effecting remote data wiping, but these solutions require that the device in question be connected to a network for the wipe to occur, which highly restricts the usefulness of such an approach.

BRIEF SUMMARY

In summary, one aspect of the invention provides a method comprising: defining a plurality of personae for a device, each persona according variable access responsive to different access criteria; applying a policy for each persona, each policy defining conditions for the different access criteria; implementing a sandbox for each persona based on the policy of each persona; according access to device resources responsive to access criteria.

Another aspect of the invention provides an apparatus comprising: one or more processors; and a computer readable storage medium having computer readable program code embodied therewith and executable by the one or more processors, the computer readable program code comprising: computer readable program code configured to define a plurality of personae for a device, each persona according variable access responsive to different access criteria; computer readable program code configured to apply a policy for each persona, each policy defining conditions for the different access criteria; computer readable program code configured to implement a sandbox for each persona based on the policy of each persona; computer readable program code configured to accord access to device resources responsive to access criteria.

An additional aspect of the invention provides a computer program product comprising: a computer readable storage medium having computer readable program code embodied therewith, the computer readable program code comprising: computer readable program code configured to define a plurality of personae for a device, each persona according variable access responsive to different access criteria; computer readable program code configured to apply a policy for each persona, each policy defining conditions for the different access criteria; computer readable program code configured to implement a sandbox for each persona based on the policy of each persona; computer readable program code configured to accord access to device resources responsive to access criteria.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
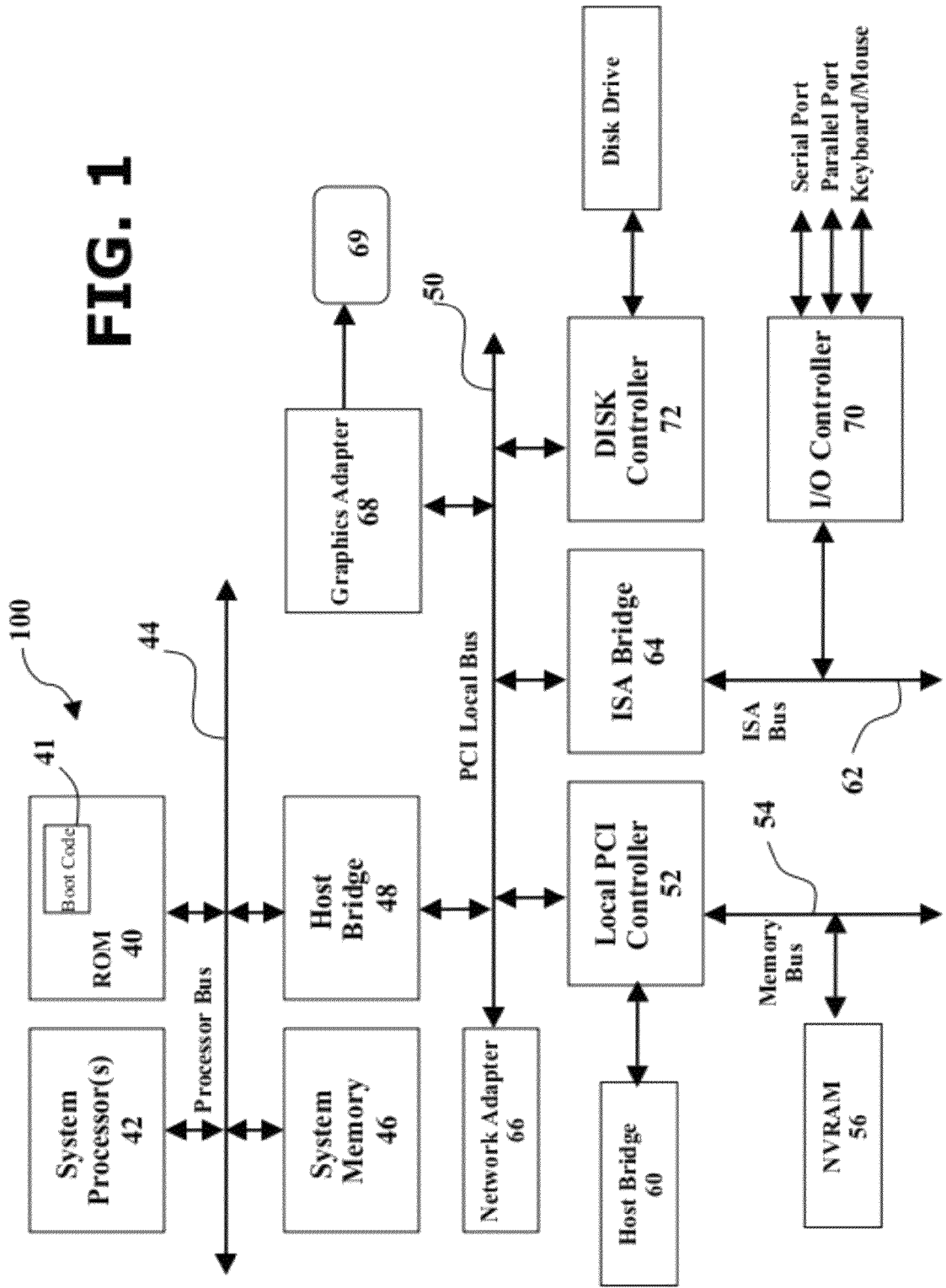
FIG. 1 illustrates a computer system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is depicted a block diagram of an illustrative embodiment of a computer system 100. The illustrative embodiment depicted in FIG. 1 may be an electronic device such as a laptop or desktop personal computer, a mobile/smart phone or the like. As is apparent from the description, however, the embodiments of the invention may be implemented in any appropriately configured device, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a keyboard, mouse, serial and parallel ports, et cetera. A disk controller 72 connects a disk drive with PCI local bus 50. The USB Bus and USB Controller (not shown) are part of the Local PCI controller (52).

Figure 2:
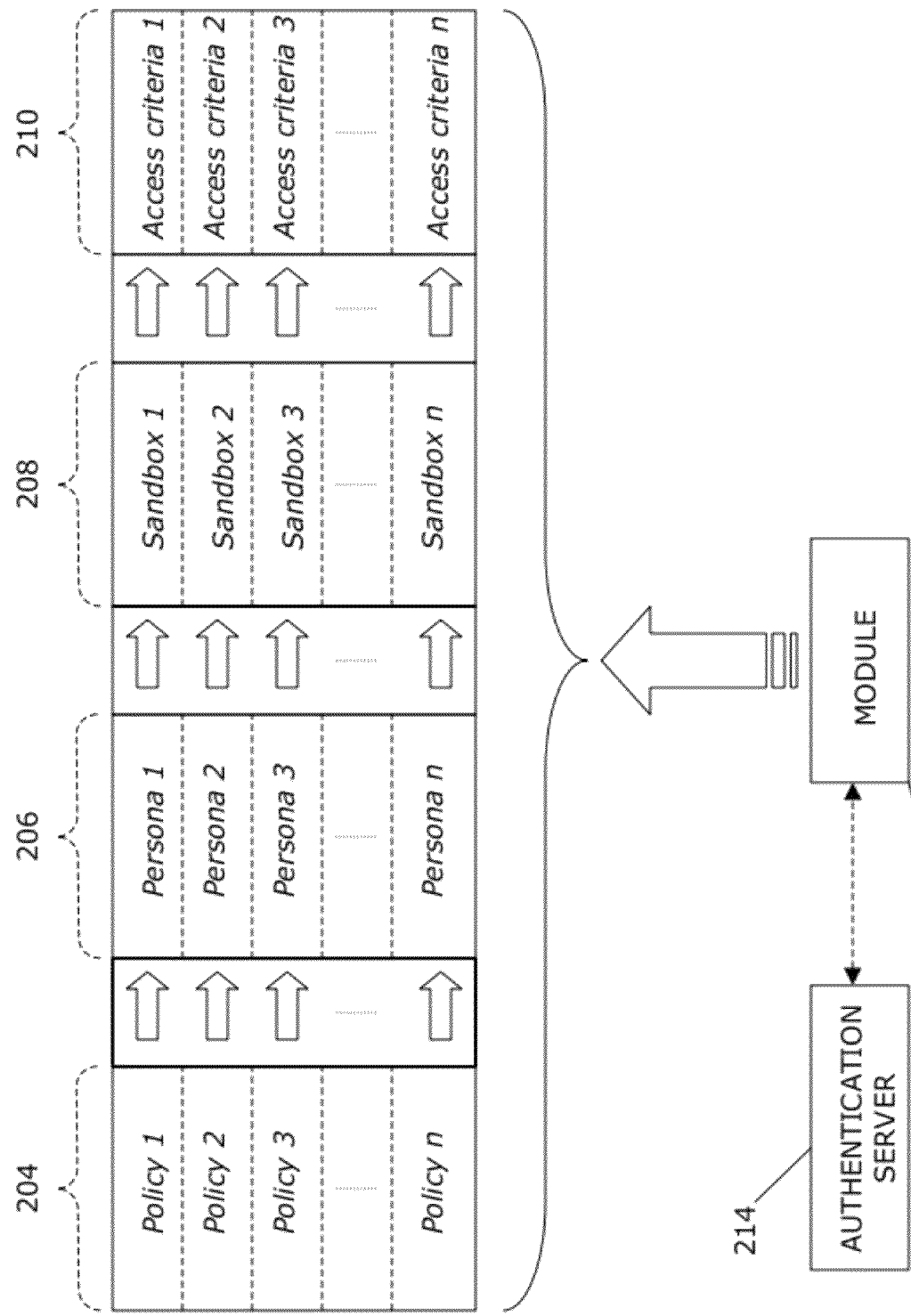
FIG. 2 shows schematically general elements of an arrangement in which different personae are created and managed.
Figure 3:
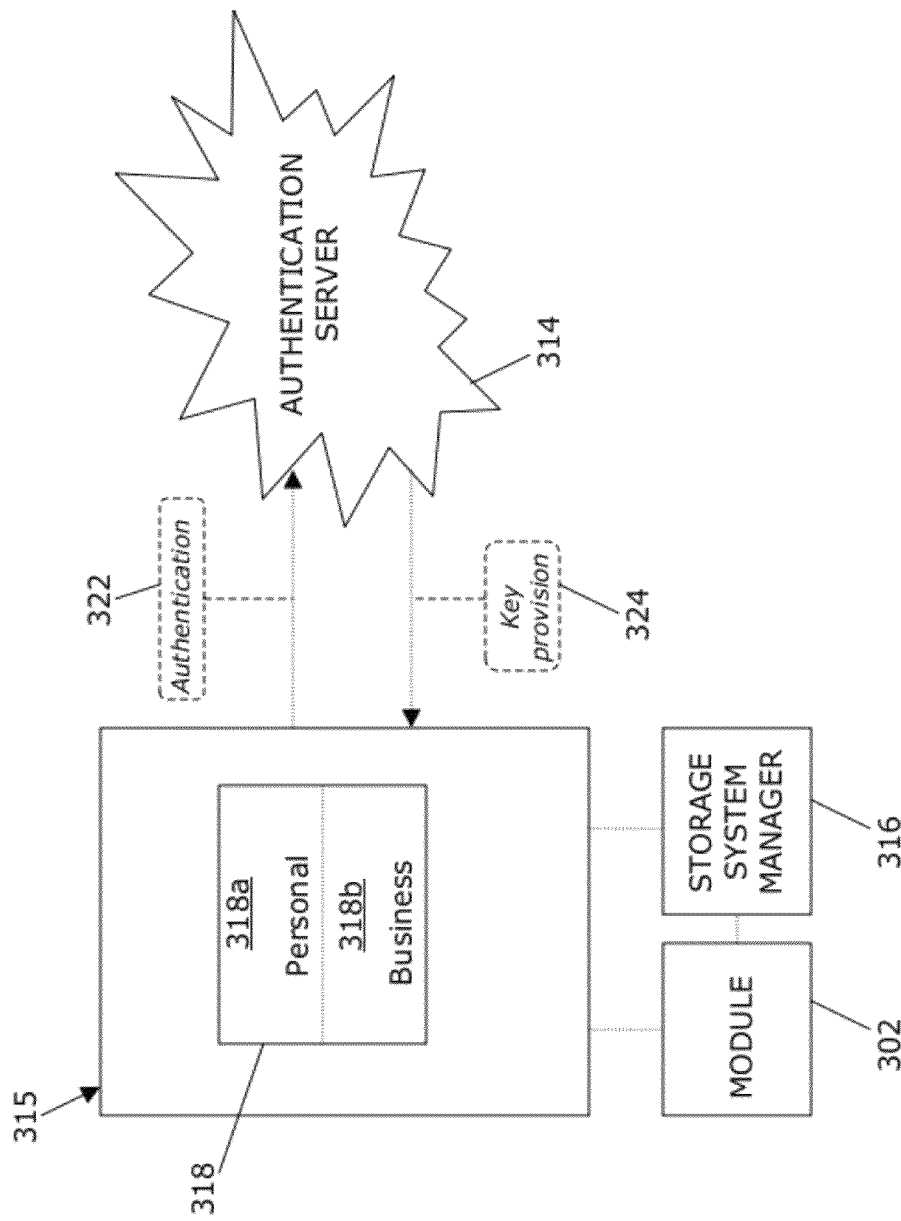
FIG. 3 schematically illustrates a mobile device in accordance with an example of persona management.

The disclosure now turns to FIGS. 2 and 3. It should be appreciated that the processes, arrangements and products broadly illustrated therein can be carried out on or in accordance with essentially any suitable computer system or set of computer systems, which may, by way of an illustrative and non-restrictive example, include a system such as that indicated at 100 in FIG. 1. In accordance with an example embodiment, most if not all of the process steps, components and outputs discussed with respect to FIGS. 2 and 3 can be performed or utilized by way of system processors and system memory such as those indicated, respectively, at 42 and 46 in FIG. 1, whether on a server computer, a client computer, a node computer in a distributed network, or any combination thereof. In accordance with embodiments of the invention, the system on which embodiments of the invention is carried out is embodied by a mobile device such as a laptop computer or a mobile phone, such as a "smart phone" with numerous functions analogous or similar to those found on many laptop or desktop computers.

Generally, in accordance with at least one embodiment of the invention, multiple personae are created or involved on a mobile device in that access is controlled based on the persona that is currently active. The concept of a "persona" will be appreciated further from the ensuing discussion. The creation or existence of different personae helps ensure or prevent data leakage or loss, in that any or all of the following characteristics, by way of example, may be manifested: business data and applications are firewalled from applications or other items associated with personal use; connectivity of the device is controlled; resources (such cameras, GPS, other sensors, etc.) on the device are controlled; data are protected even if removable storage or the device itself are lost.

In the context of mobile phones and other mobile devices, applications are typically downloaded or added at install, if not already built in. Mobile phone applications are well. In these cases, however, access of applications is binary in nature, i.e., access to the applications is either present or not, and the access of application to features of the device (e.g. network connections, sensors such as accelerometers, GPS, camera, storage devices such as SD cards) is similarly binary in nature, wherein the state of access is immutable once set. In other words, the applications or the access thereto are not modulated by any context or change in context in which the device operates at any given time.

FIG. 2 shows schematically general elements of an arrangement in which different personae are created and managed, in accordance with embodiments of the invention. As shown, a module 202 is provided in a system (e.g., in a computer system such as that indicated at 100 in FIG. 1, which in accordance with at least one embodiment of the invention is a mobile device system such as a mobile phone system) to generally determine and manage which programs or systems are accessible to a given party (e.g., user or group of users) or not. As needed, it overrides an access check mechanism that might normally be controlled by a user. Module 202 can be in a kernel or runtime environment of a device (such as a mobile device) controlled by the user as needed. Such a module can be in the kernel or in the runtime environment. The function of a module 202 will now be better appreciated from the ensuing discussion. In accordance with at least one embodiment of the invention, the module 202 resides in the device but can be updated by a remote server such as the authentication server 214 described below.

As shown, module 202 is configured to enact and manage policies 204, personae 206, sandboxes 208 and access lists 210, each of which are related to one another, in accordance with at least one embodiment of the invention, in a manner now to be described.

Policies 204 created on a system are configured to determine access that is allowed and disallowed in connection with each of different (corresponding) personae 206. Thus, a first policy ("Policy 1" at 204) will determine access to a first persona ("Persona 1" at 206) and a second policy ("Policy 2" at 204) will determine access to a second persona ("Persona 2" at 206), etc. In accordance with at least one embodiment of the invention, each policy 204 is individually created via module 202 by an owner or other authorized individual(s) connected with the corresponding persona 206.

As touched upon heretofore, in accordance with at least one embodiment of the invention, a device can operate in any of the multiple personae 206, wherein each persona 206 maps to a particular context. For instance, different personae 206 may include, but are not necessarily limited to, personal use of the device, use of same by a friend or trusted associate, use of same for office work, use of same in a particular geographic location etc.

In accordance with at least one embodiment of the invention, via module 202, there is created in conjunction with each persona 206 a sandbox 208 (i.e., a security mechanism for separating running programs) in which only predefined or predetermined applications can run, network connections be allowed, devices be used, and data be accessible. In other words, each sandbox 208 is configured to assert strictures on different elements available in connection with each persona 206, wherein limited access or a bar to access might be provided with certain programs or applications, etc., in accordance with one persona 206 but not another. Thus, module 202 essentially contains policy-originated information about the sandboxes 208 of the personae 206 and the associated permissions, prohibitions and device behaviors associated with each persona 206.

In accordance with at least one embodiment of the invention, personae are switched based on authentication. In accordance with at least one embodiment of the invention, password-based authentication is used, but alternatives are possible such as (e.g., voice-based) biometrics. The switch from one persona to another can be automatic upon some trigger event, such as an application being invoked, or a change in geographic location, or by a change in network provider, etc.

Indicated at 210 are access criteria corresponding to each persona 206 (and sandbox 208) which, in accordance with at least one embodiment of the invention, are stored in module 202. The access criteria 210 corresponding to each persona 206 can be in the form of specific authorized individuals or groups that are permitted to access the corresponding persona 206, or other criteria such as geographic criteria or criteria based on network provider which determine which persona (e) will be accessible at a given time or based on certain conditions.

In accordance with at least one embodiment of the invention, data made available in accordance with each persona 206 may be encrypted, wherein different encryption methods or keys can be used with different personae 206 (or, in the case of personae 206 where non-sensitive data are involved, no such encryption need necessarily be employed). In accordance with embodiments of the invention, module 202 communicates with a remote authentication server 214 to determine whether a user attempting to access data associated with a persona 206 (e.g., via providing a password at a password prompt) should indeed be given access. If the authentication server 214 determines that access indeed should be given, then a key is dynamically provided back to the module 202 to permit access.

In accordance with a variant embodiment of the invention, the access policies or criteria 210 associated with the different personae 206 can be contained in the device and updated periodically via a remote server such as authentication server 214. However, in many cases enterprise user authentication via an authentication server 214 in real-time may be preferable, e.g., if an employee has changed his/her password and such an update may not have yet reached the device. Moreover, it may not be feasible to store and update password information on the mobile device and employ all the security mechanisms required to protect such sensitive information.

In order to offer access based on geography or on a network provider, access criteria/policies 210 can include such information and parameters. The module 202 can then match such parameters with the current location or network provider as determined by any appropriate detection mechanisms within the device (e.g., a GPS function). This might thus not need to involve the use of an authentication server 214.

FIG. 3 schematically illustrates a non-restrictive example of a mobile phone 315 in accordance with at least one embodiment of the invention. The phone 315 may be similar in makeup to a phone using the "ANDROID" operating system (see herebelow and the description of FIGS. 4-9).

In accordance with the illustrative and non-restrictive example of FIG. 3, a module 302 with functions similar to those described is installed in the runtime environment of the phone 314. An image 318 on the phone here contains two components, namely 318a ("personal") and 318b ("business"). The personal component 318a of image 318 is a touch-activated field to activate a "personal" persona, which could be related to personal files and applications, etc., while the business component 318b of image 318 is a touch-activated field to activate a "business" persona, which could be related to business or enterprise-related files and applications, etc.

In the illustrative and non-restrictive example of FIG. 3, a storage system manager 316 is provided which is configurable to manage access to different storage media or databases within phone 314 or as may be associated with phone 314 (such as a SD (secure digital) card integrable with phone 314). An example of a storage system manager is the Enterprise Volume Management System (EVMS), which is flexible, integrated volume management software used to manage storage systems under "LINUX". A dedicated element such as a volume daemon may be employed to mount or unmount sensitive data or files. "VOLD" is an example of such a volume daemon that is used with "LINUX". The storage system manager 316, in accordance with the illustrative and non-restrictive example of FIG. 3, "mounts" sensitive (and encrypted) data files as such to provide access to more sensitive data as may be encountered in a business persona.

In accordance with the illustrative and non-restrictive example of FIG. 3, assuming that the business mode or persona contains more sensitive information destined solely for authorized individuals, then, an authentication process 322 takes place upon selection of the business persona (318b). Upon successful authentication, the remote authentication server 314 returns a key 324 which then prompts storage system manager 316 to "mount" the sensitive files as just described. Also an "intent" to switch personae is conveyed by module 302 to other components of phone 315.

The disclosure now turns to a more detailed discussion of specific embodiments of the invention that may be employed in connection with smart phones or mobile phones.

As the price point for computing comes down, cell phones are becoming increasingly more sophisticated. Smartphones typically have multiple network interfaces, removable local stores such as SD cards, GPS or aGPS functionality, cameras, accelerometers, and in some cases even physiological monitoring sensors. Such smart phones are often used in a multiple modes—for instance for both personal and business purposes. Enterprises that allow employees to use the phones in this dual mode need to protect the information and applications on such devices and control their behavior. Broadly contemplated herein, in accordance with at least one embodiment of the invention, are approaches that integrate declarative policies, context and OS level device control to enforce security by creating multiple personae for the device.

Generally, mid to high end smartphones have become commonplace in corporate settings. The anytime anywhere access to work resources engendered by these devices and wireless networks is of great interest to the company, and often also of interest to the employee looking for a flexible work schedule. Employees often use such devices for personal uses as well, to avoid having to carry two smartphones. Thus the same smartphone, with its features, is used in a corporate as well as personal setting, has both types of applications (or apps), and stores both personal and corporate data. This can lead to significant security concerns. Sensitive data can be compromised by making the device behave inappropriately using one of the installed applications, or by hacking into the device using its connectivity to public networks. Data can even be compromised by the device being lost, or someone stealing the removable storage media or the device itself. In accordance with at least one embodiment of the invention, such issues can be addressed by forcing the device to isolate its functionality and behave differently when being used in different contexts.

Although smartphones are compact and lightweight, they are capable of various modes of wireless communication like "WIFI", "BLUETOOTH" and infrared, have significant computational power (approaching 1 GHz), and have moderate sized removable local stores such as SD cards. Many phones have cameras. Newer phones also have GPS or aGPS functionality, accelerometers, and in some cases even physiological monitoring sensors. Specialized devices also have RFID or barcode readers added on, and more recently, have combined software solutions with cameras to read 2D barcodes. With a variety of such devices on the cell phone, applications are emerging that access these functionalities. Application markets and open APIs associated with most major platforms have allowed third parties to write such apps as well. While some platforms restrict these device functionalities to only applications "installed" on the phone, it is expected that applications running in the browser (or other elements of the client side web infrastructure) would also need access to these device capabilities. Given the somewhat restrictive application distribution model adopted by some providers such as Apple, a web based approach is naturally attractive to independent, third party application developers. Applications are also developed (or adapted) by in house corporate IT teams.

The connectivity of these devices has improved considerably and most devices are continuously connected to the Internet via one of the radio interfaces. This continuous connectivity poses various security concerns. This can result in accidental/intentional leakage of sensitive enterprise data. Mobile devices also traverse a number of wireless networks making them susceptible to attacks such as bluejacking, or other methods to insert malicious code. Thus, some capabilities of the device may have to be disabled or restricted in order to protect the data it stores and the enterprise network it connects to as a trusted entity. Government agencies and companies often lease out such devices to their employees which are carried around outside physically secured premises. This makes them vulnerable to theft or loss. This poses a serious security threat given the fact that the device may be carrying sensitive data or having special capabilities which if not revoked can prove damaging to the organization.

There are broadly contemplated herein, in accordance with embodiments of the present invention, arrangements for firewalling personal data/applications from enterprise data/applications in order to mitigate the threats posed to the device. In accordance with at least one embodiment of the invention, each "persona" (as understood from the discussion hereinabove) has its own sandbox to run, and is isolated from other personae. A corresponding policy determines what is permitted within each sandbox. In accordance with at least one embodiment of the invention, there is provided a security mechanism in which the device functions in distinct modes, such as in separating personal use from enterprise (or business) use. While a personal mode allows unrestricted access to wireless interfaces, enterprise data storage is not mounted in such a mode in accordance with at least one embodiment of the invention. On the other hand, in accordance with at least one embodiment of the invention, enterprise mode allows access only to the organization's intranet via VPN (virtual private network) while working with the encrypted enterprise data.

For example, in accordance with at least one embodiment of the invention, the enterprise may have specified in a policy that device capabilities like 802.11, "BLUETOOTH", and GPRS (general packet radio service) are unrestricted while in the personal mode. However, if the user wishes to read official (business) email, it requires the device to switch to the enterprise mode. In this mode, the policy directs the enforcement mechanisms on the device to disable the cellular radio and "BLUETOOTH", and limit access via 802.11 interfaces to the enterprise VPN. The device platform is modified to actually enforce the issued policies. The enterprise VPN server is entrusted with the task to verify the login credentials of the user requesting to switch to the enterprise mode and to verify the authenticity of the device before granting network resources to the device. The device authentication is carried out by ensuring that the device is actually running the customized build of the platform distributed by the enterprise.

There is employed, in accordance with at least one embodiment of the invention, a declarative policy-based approach, where the norms or rules of ideal behavior, or the boundaries of the sandbox, of entities in a variety of environments are described in a machine-understandable specification language. These policies describe what an entity can or must do in a certain context and allow the behavior of entities to be modified without affecting the underlying mechanisms and architecture. Along with providing the openness required in these environments, this approach also provides greater autonomy as entities can choose whether or not to accept a particular norm.

In accordance with at least one embodiment of the invention, a "policy" involves an explicit representation of constraints and rules that govern an agent or system's behavior. As an example, a device might not be able to run the email application unless the device is in the enterprise mode and the user specifies a mail specific password. Policies can define what is permitted or prohibited, what is preferred of the permitted actions, and what obligations must be incurred in order to undertake an action. Such policies, when expressed in languages that the other party in an interaction can understand, can be used to negotiate permissions where none existed a-priori. Semantic web languages such as RDF and OWL prove a natural choice for such languages.

By way of an illustrative and non-restrictive example, "ANDROID" is now considered. The "ANDROID" operating system, used by the "ANDROID" phone, is a free, open source, and fully customizable mobile platform by Google Inc. (Menlo Park, Cal.) and the Open Handset Alliance (www.openhandsetalliance.com) "ANDROID" offers a full stack: an operating system, middleware, and key mobile applications. It also contains a set of APIs (application programming interfaces) that allow third-party developers to develop applications. All applications are written using the Java programming language. The application framework provides APIs to all applications, Underlying all applications is a set of services and systems providing various functionalities. "ANDROID" includes a set of C/C++ libraries used by various components of the "ANDROID" system. These capabilities are exposed to applications through the "ANDROID" application framework. "ANDROID" includes a set of core libraries that provides most of the functionality available in the core libraries of the Java programming language. Every "ANDROID" application runs in its own process, with its own instance of the Dalvik virtual machine (VM), The Dalvik VM relies on the underlying "LINUX" kernel for core system services such as security, memory management, process management, network stack, and driver model.

A service does not have a visual user interface, but rather runs in the background for an indefinite period of time. Most core system functions are carried out by services. A broadcast receiver is a component that does nothing but receives and reacts to broadcast announcements. Many broadcasts originate in system code to notify the rest of the system about a change in the state of the system. Services and broadcast receivers are activated by asynchronous messages called intents. These intents name the action being announced making the concerned service handle the state as required.

"ANDROID" is a multi-process system, in which each application (and parts of the system) runs in its own process. Most security between applications and the system is enforced at the process level through standard "LINUX" facilities, such as user and group IDs that are assigned to applications. Additional finer-grained security features are provided through a permission mechanism that enforces restrictions on the specific operations that a particular process can perform. The permissions required by an application are declared statically in that application, so they can be known up-front at install time and will not change after that.

In the present illustrative and non-restrictive example in accordance with at least one embodiment of the invention, for "ANDROID", there is considered here an alternate approach that creates the sandbox as a "mode" similar to built-in modes like such as the well-known "Airplane mode" (where certain signal transmitting capabilities of a phone are suspended). In accordance with the present example, a customized image is built from source while "ANDROID" system services are employed to disable interfaces at the framework level.

For implementation on an "ANDROID" platform in accordance with the present example, policy is expressed in XML, wherein device constraints are directly described. Further, certain setup functions are performed during initialization of the device. For instance, in accordance with the present example, an application is created for the purpose of accepting a user's enterprise login credentials. The user settings interface presents a button to issue the command for switching back and forth between the two modes (i.e., personal and enterprise/business).

The description now continues with specific reference to FIGS. 4-9, which show various configurations of a mobile device (i.e., phone) 415. Reference may be made jointly to any or all of these six figures as needed.

Figure 4:
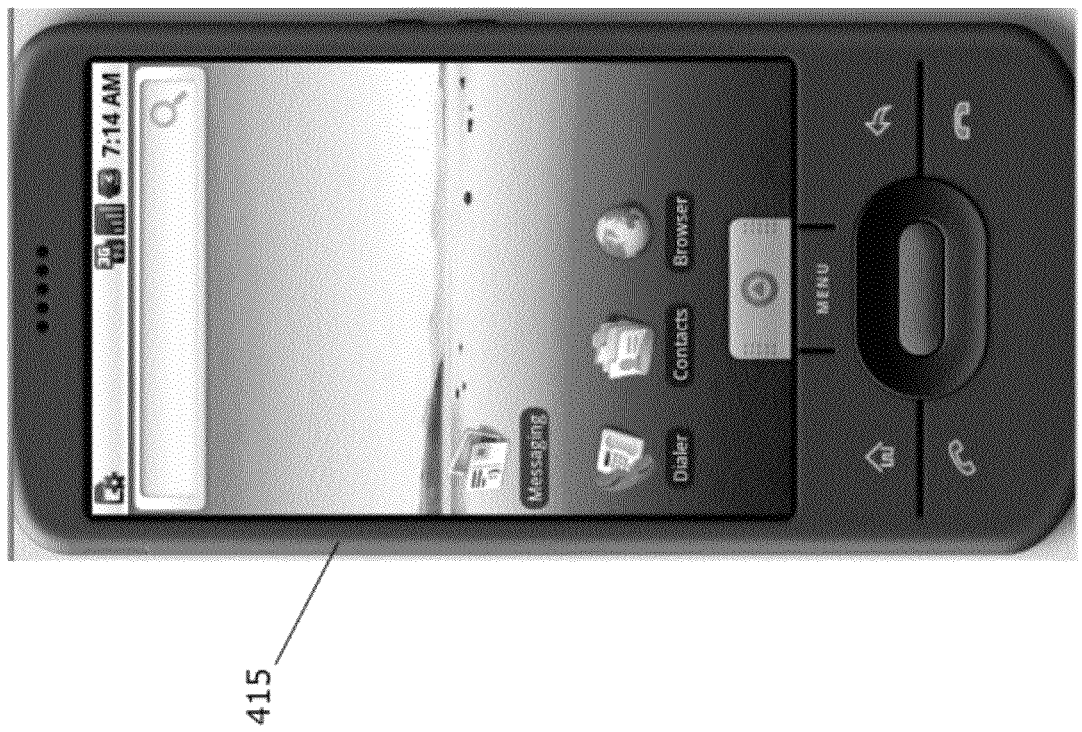
FIGS. 4-9 illustrate various configurations of a mobile device in accordance with a more detailed example of persona switching and management.
Figure 5:
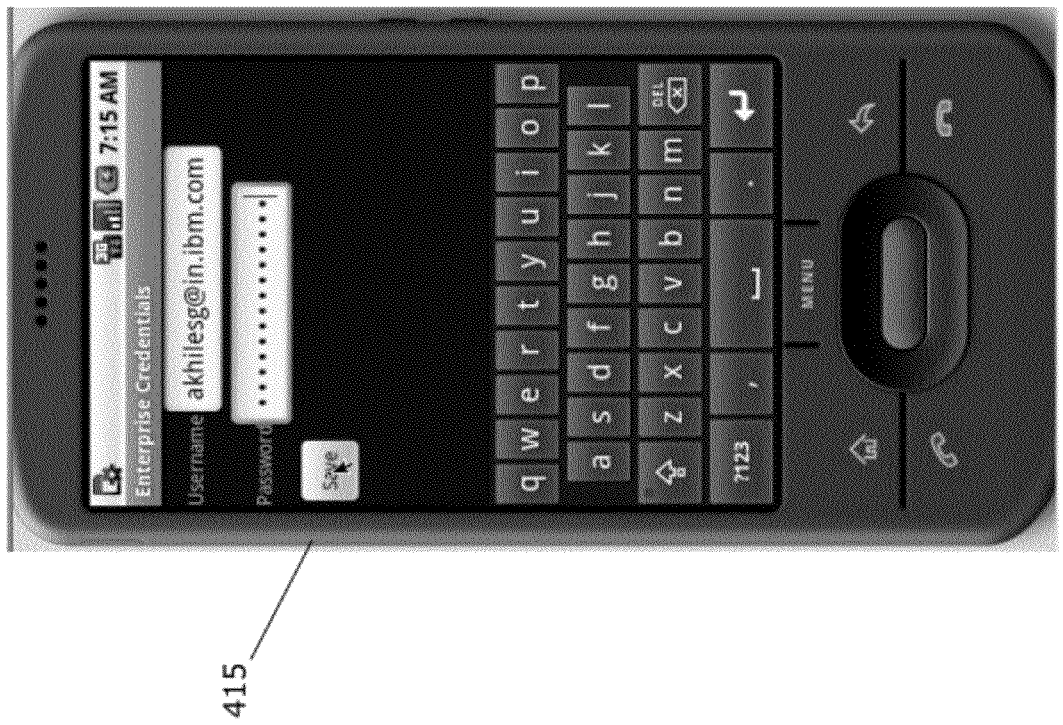

In accordance with the present example, during the boot process, the device 415 reads the enterprise policy from the policy file (included as part of the build) and configures enterprise mode accordingly. A volume daemon detects the external storage card and stores its configuration and mount point. The device 415 boots up in the personal mode, as shown in FIG. 4. On receiving the boot completed intent, the mount service on the device 415 unmounts the external storage reserved for the enterprise mode.

The user opens the application for entering enterprise login credentials. These can be either entered dynamically when switching, or be saved securely in the system settings; see FIG. 5. When the user issues the command for switching the mode, the stored enterprise login credentials are sent to the enterprise server (or authentication server) for validation. The response is checked for a successful login.

An intent is generated to indicate the switch to the new mode and is broadcast to inform the rest of the device 415. The services corresponding to each of the radio interfaces execute the handler for this intent. The handler decides if the radio interface is sensitive to the enterprise mode (as defined by the enterprise policy) and enables or disables the corresponding radio based on the mode being reached. The status icons on the user interface are updated to present the current status of various wireless interfaces on the device 415. The user interface buttons corresponding to each of these radios also handle this intent and enable or disable their interface presence. In accordance with the present example, all network connections are disabled when in enterprise mode, and only the VPN connection to the enterprise gateway is permitted. This will prevent data leaks on any network path.

The mount service invokes the volume daemon to mount or unmount the external SD storage and update the user interface accordingly. Here, the SD storage is mounted for enterprise mode and unmounted it for personal usage. For added security, the file system (or at least parts of it needed for the enterprise) on the SD card would be encrypted. The key, instead of being stored locally on the device 415, would be provided by the enterprise gateway via the encrypted VPN channel upon successful authentication.

In accordance with the present example, any data stored on the external storage is not secured. Thus, in accordance with the present example, the external storage is reserved for enterprise data and can be accessed only in the enterprise mode. The external storage in "ANDROID" is handled by the Volume daemon mentioned heretofore.

Figure 6:
Figure 7:
Figure 8:
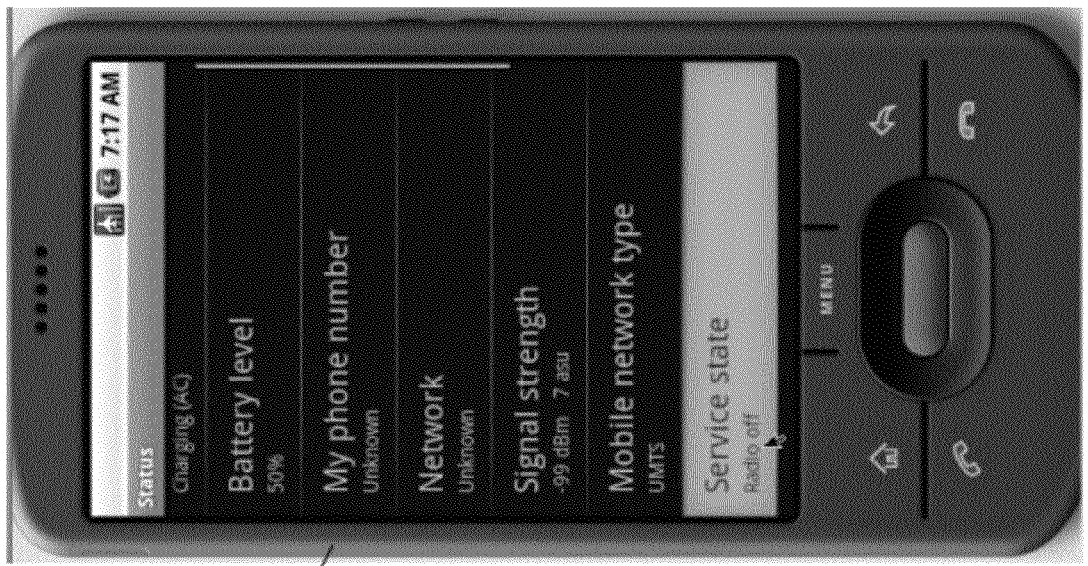
Figure 9:
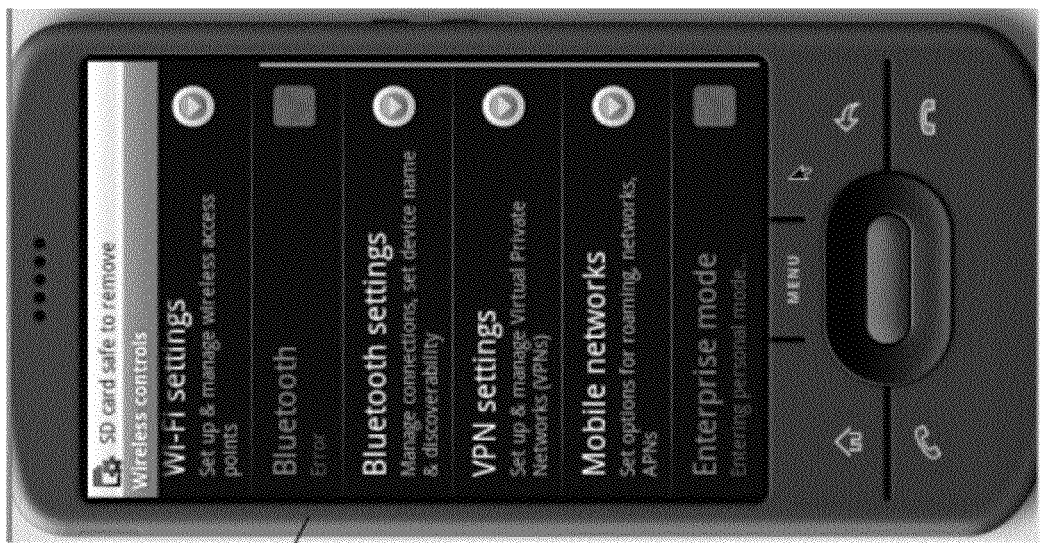

FIGS. 6, 7 and 8 show, with respect to device 415, the disabling of the radios/network and mounting of the external SD card in response to a successful authentication into the enterprise mode. Particularly, in FIG. 6, it is shown that authentication with the enterprise server is successful. Radios are turned off according to enterprise policy and the SD card is prepared for mount. In FIG. 7, radios mentioned in the enterprise policy get disabled and the SD card gets mounted. In FIG. 8, the phone status menu shows switched-off radio.

In accordance with the present example, the user can go back to the personal mode by unselecting the enterprise mode. Here, no authentication is done for this reverse switch, although it could be easily added if desired. When switching back to the personal mode, the radios are enabled, and the SD Card is unmounted as seen with device 415 in FIG. 9.

Figure 10:
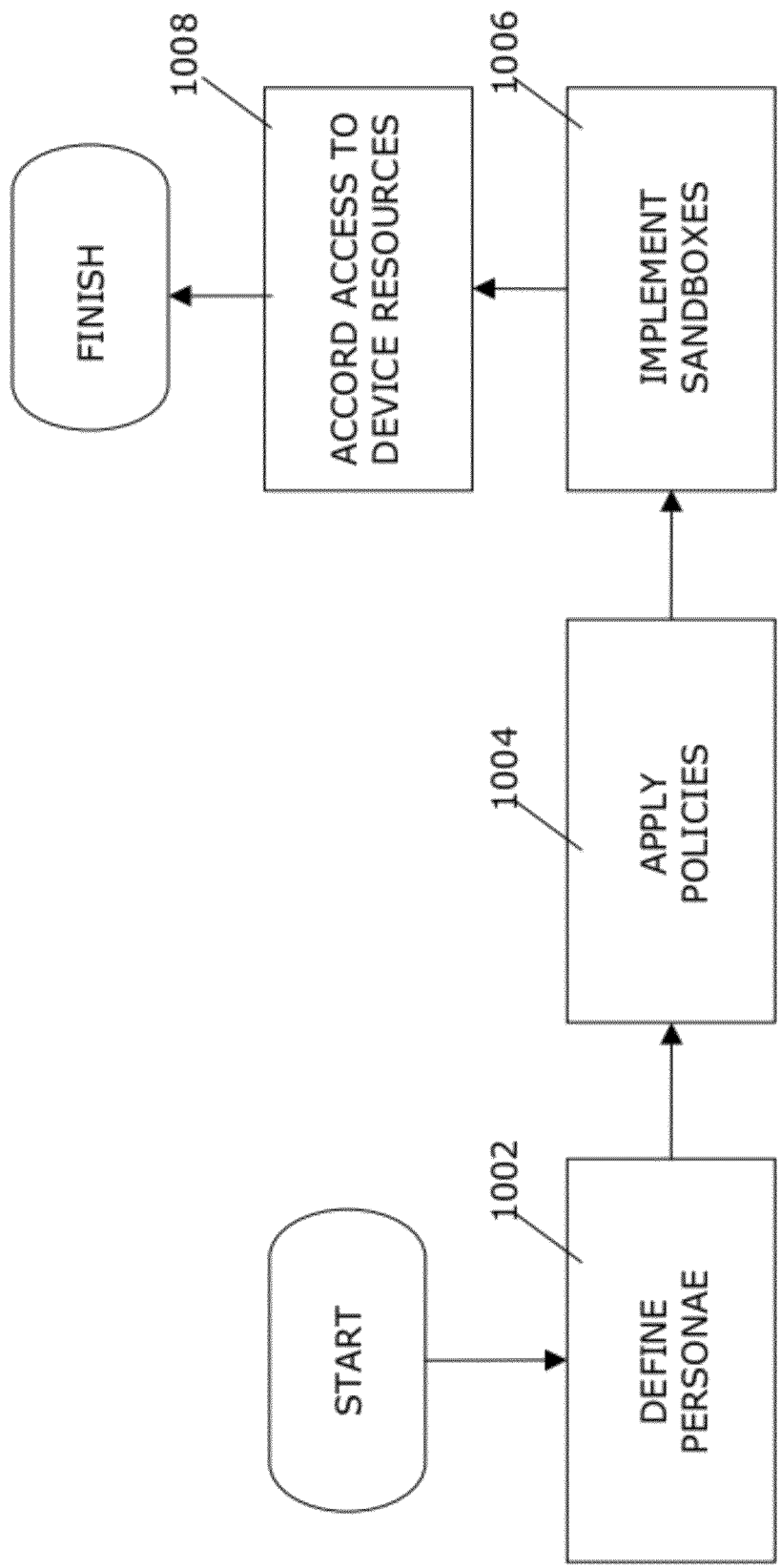
FIG. 10 sets forth a process more generally for persona management.

FIG. 10 sets forth a process more generally for persona in accordance with at least one embodiment of the invention. It should be appreciated that a process such as that broadly illustrated in FIG. 10 can be carried out on essentially any suitable computer system or set of computer systems, which may, by way of an illustrative and on-restrictive example, include a system such as that indicated at 100 in FIG. 1. In accordance with an example embodiment, most if not all of the process steps discussed with respect to FIG. 10 can be performed by way of system processors and system memory such as those indicated, respectively, at 42 and 46 in FIG. 1.

As shown in FIG. 10, supplier nodes (602) and client nodes (604), respectively, are represented in a network representation. A supplier-client relationship is established (606) and a score is assigned to the same (608), corresponding to relationship strength. A score is assigned to a client node (610), the client node score corresponding to a general relationship strength with respect to the supplier nodes in aggregate. The supplier-client relationship score is amended after a predetermined time period (612).

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
   utilizing a processor to execute computer code configured to perform the steps of:
   defining a plurality of personae for a device, each persona according variable access responsive to different access criteria;
   applying a policy for each persona, each policy defining conditions for the different access criteria;
   defining a sandbox for each persona based on the policy of each persona, each sandbox comprising a security mechanism for separating running programs; and
   according access to device resources responsive to access criteria;
   said according of access comprising mounting at least one data file relative to at least one of the personae.

2. The method according to claim 1, wherein said defining comprises defining personae based on usage contexts.

3. The method according to claim 2, wherein said defining personae based on usage contexts comprises defining an enterprise persona.

4. The method according to claim 3, wherein said defining personae based on usage contexts comprises defining a personal persona.

5. The method according to claim 1, wherein said defining comprises defining personae based on geographical location.

6. The method according to claim 1, wherein said according of access is triggered automatically.

7. The method according to claim 6, wherein said according of access is triggered responsive to secure authentication by a user.

8. The method according to claim 7, further comprising providing a key to the device responsive to secure authentication by a user and thereafter according the user access to predetermined data.

9. The method according to claim 1, wherein the device comprises a mobile device.

10. An apparatus comprising:
one or more processors; and
a computer readable storage medium having computer readable program code embodied therewith and executable by the one or more processors, the computer readable program code comprising:
computer readable program code configured to define a plurality of personae for a device, each persona according variable access responsive to different access criteria;
computer readable program code configured to apply a policy for each persona, each policy defining conditions for the different access criteria;
computer readable program code configured to define a sandbox for each persona based on the policy of each persona, each sandbox comprising a security mechanism for separating running programs; and
computer readable program code configured to accord access to device resources responsive to access criteria, via mounting at least one data file relative to at least one of the personae.

11. The apparatus according to claim 10, wherein the device comprises a mobile device.

12. A computer program product comprising:
a non-transitory computer readable storage medium having computer readable program code embodied therewith, the computer readable program code comprising:
computer readable program code configured to define a plurality of personae for a device, each persona according variable access responsive to different access criteria;
computer readable program code configured to apply a policy for each persona, each policy defining conditions for the different access criteria;
computer readable program code configured to define a sandbox for each persona based on the policy of each persona, each sandbox comprising a security mechanism for separating running programs; and
computer readable program code configured to accord access to device resources responsive to access criteria, via mounting at least one data file relative to at least one of the personae.

13. The computer program product according to claim 12, wherein said computer readable program code is configured to define personae based on usage contexts.

14. The computer program product according to claim 13, wherein said computer readable program code is configured to define an enterprise persona.

15. The computer program product according to claim 14, wherein said computer readable program code is configured to define a personal persona.

16. The computer program product according to claim 12, wherein said computer readable program code is configured to define personae based on geographical location.

17. The computer program product according to claim 12, wherein said computer readable program code is configured to accord access via an automatic trigger.

18. The computer program product according to claim 17, wherein said computer readable program code is configured to accord access automatically responsive to secure authentication by a user.

19. The computer program product according to claim 18, wherein said computer readable program code is further configured to provide a key to the device responsive to secure authentication by a user and thereafter accord the user access to predetermined data.

20. The computer program product according to claim 12, wherein the device comprises a mobile device.

* * * * *